Dec. 17, 1957  M. SPERTUS  2,816,382
EASEL SUPPORT FOR PHOTO FRAMES
Filed July 25, 1957
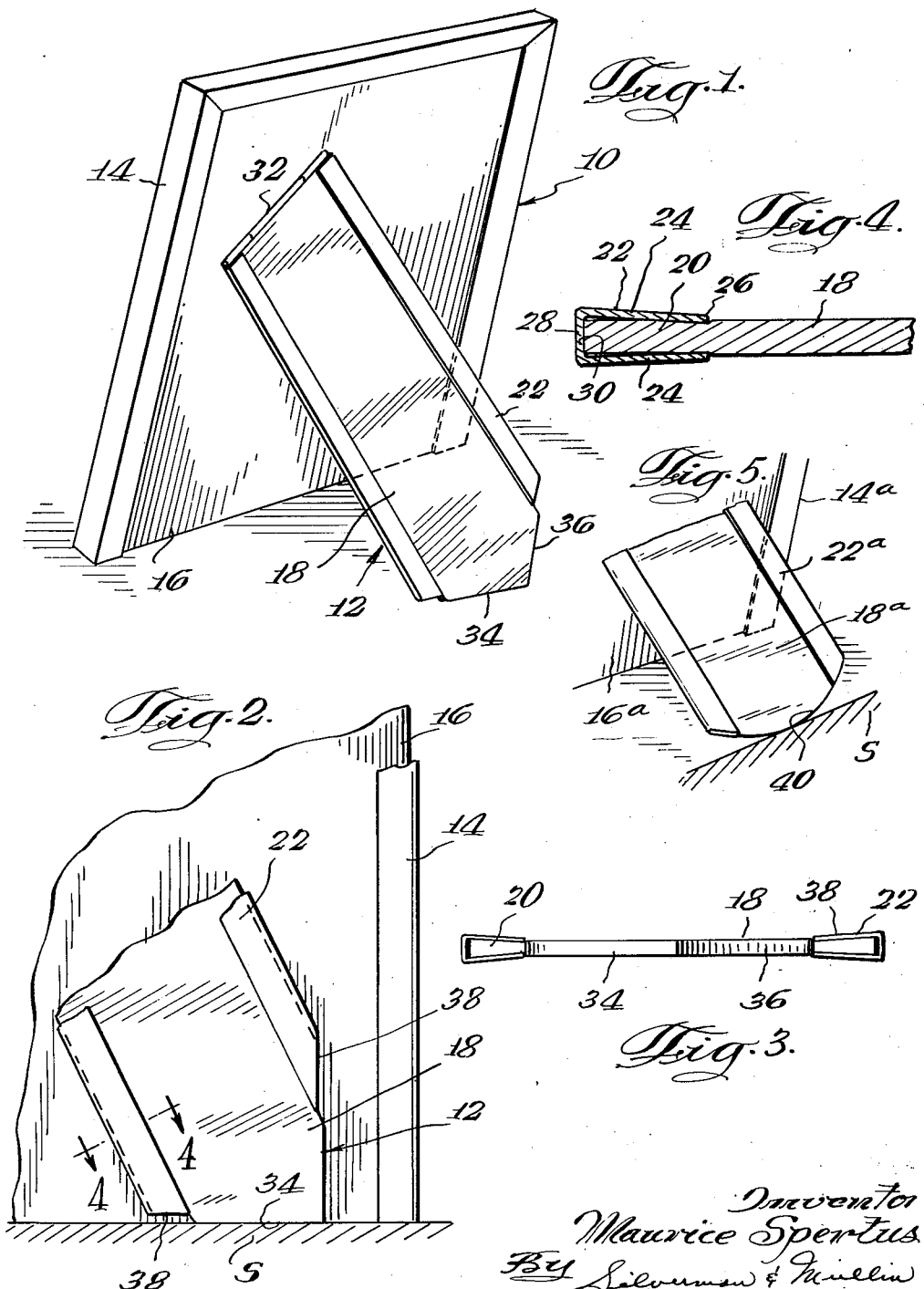

United States Patent Office 2,816,382
Patented Dec. 17, 1957

2,816,382

EASEL SUPPORT FOR PHOTO FRAMES

Maurice Spertus, Highland Park, Ill.

Application July 25, 1957, Serial No. 674,121

9 Claims. (Cl. 40—152.1)

The invention relates to photograph frames of the type adapted to be supported on a flat surface and more particularly to improvements in the easel support members of such frames.

It is well-known that photograph and picture frames of the type adapted to display a photograph or picture as supported on a flat surface are ordinarily supported in an angular position with respect to the horizontal supporting surface by easel support members which are hingedly mounted to the back of said frames. The easels are so designed that the picture is supported in a plane the angle of which exceeds 45° from the horizontal. The exact angle of most effective display is predetermined by the length, shape and design of the easel member and the manner in which it is attached to the back of the photo frame. Hence, any change in the shape, size or form of the easel after it has been attached to the picture frame will affect the proper positioning of the picture itself.

Since picture frames have heretofore been made from materials which were not very resistant to change of shape such as by warping resulting from absorption of moisture, accidental bending, breakage, or other deformation; maintaining the proper display position of photographs has long presented a problem to manufacturers. Recognizing this problem manufacturers have made numerous attempts to rectify this situation by substituting plywood for the usual carboard materials from which easels are usually manufactured, by using thick laminated cardboard structures and attempting other remedial measures. However, all of these materials eventually warped either because of absorption of moisture or because of the weight of the picture frame itself being exerted against the easel in an angular direction. Obviously the use of larger and wider easels were objectionable because of the increased weight and clumsy appearance. Hence, the problem to my knowledge has not yet been solved satisfactorily.

It is therefore an important object of this invention to provide a photo frame easel which will overcome all of the objections mentioned hereinabove.

Another object is to provide a picture-frame easel support which will resist warping or change of shape due to any of the factors mentioned hereinabove including the absorption of moisture by the easel material.

A further object is to afford an easel capable of effectively supporting photo frames of any normal size or weight in its proper predetermined angular plane throughout the normal life of the frame itself.

Still another object is to provide a picture-frame easel the size and weight of which is substantially less than the usual size and weight of easels as employed heretofore.

Still a further object is to afford a photo frame easel which may be readily attached by means of a hinge or the like to the back of a photo frame.

Yet another object is to provide a picture-frame easel structure of simple inexpensive construction, yet sturdy and attractive.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings preferred embodiments thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of a picture frame with an easel support member embodying the principles of my invention;

Fig. 2 is a fragmentary view of a picture frame and the bottom portion of the easel support;

Fig. 3 is a bottom end view of the easel;

Fig. 4 is an enlarged fragmentary sectional view taken on the plane of line 4—4 in Fig. 2 of the drawings and viewed in the directions indicated; and Fig. 5 is a fragmentary view of a portion of the picture frame and the bottom portion of a modified form of the easel support.

Turning now to Fig. 1 of the drawings, reference numeral 10 indicates generally a picture frame with my improved easel support member indicated generally by reference numeral 12 hingedly connected to the picture frame. The picture frame again may be of any conventional structure and in the embodiment chosen for illustration comprises a metal channel-shaped molding strip 14 in which the marginal edges of a backing member such as 16 is positioned. The backing member 16 may be made of any suitable material such as cardboard or the like.

The easel support member 12 comprises a strip 18 of relatively thin cardboard having both of its marginal side edges 20 each positioned and clamped within an elongated metal channel member 22. The channel 22 may be made of any suitable material, but preferably thin gauge steel, having its sides such as 24 inclined in cross-section so that the outer edges 26 thereof pinch the cardboard strip 18, thereby retaining the channel in immovable and secure position on the cardboard strip. The outer channel segment 28 connecting the channel sides 24 is adapted to be positioned in abutting relationship with the outer edge 30 of the cardboard strip 18.

The top edge of the easel member 12 may be secured to the photo frame backing member 16 in any suitable manner but in the embodiment chosen for illustration it will be noted in Fig. 1 of the drawings that a partial hinge member 32 is utilized. It will further be noted that the top of the easel is mounted in an oblique plane and that the bottom end of the easel is formed in a V shape to afford two supporting surfaces 34 and 36 each of which is angularly disposed to the other. The planes of these bottom ends 34 and 36 are such that when the easel is extended in supporting position the picture frame will be supported on a surface S in its proper and most effective position. In Figs. 1 and 2 of the drawings it will be noted that the frame is supported with its longest sides vertically disposed. However, when it is desired to display a wide picture the photograph frame may be turned through an angle of 90° so that the same rests on one of its longer sides. The other easel supporting edge 36 is then brought in contact with the supporting surface S thereby supporting the picture in its proper and most effective position.

Since the channels 22 are made of metal it is desirable to prevent any portion of the same from coming in contact with the surface S to prevent scratching of the same especially when the surface comprises a highly polished wooden member. This is readily achieved by making the cardboard member 18 slightly longer than the metal channels 22 so that the bottom surface 38 of the channel is spaced from the top surface of the supporting member S, as shown in Fig. 2 of the drawings. When so constructed only the cardboard member 18 comes in contact with the supporting surface. Since the relatively soft cardboard obviously is less apt to mar the surface S, such a structure is most effective in preventing the scratching or marring of the same.

In Fig. 5 of the drawings a modification of the easel supporting member is shown which likewise achieves the same purpose by preventing the contact of the metal channels with the supporting surface S. Similar parts are designated by like numerals with the added suffix *a*.

In this embodiment the bottom surface of both the channels 22*a* and the cardboard strip 18*a* are formed in a continuous arc such as 40 so that the central portion of the strip 18*a* protrudes beyond the bottom edges of the channels 22*a*. This likewise spaces the bottom edges of the channels from the supporting surface S so that the same cannot mar or scratch the surface. Only the bottom edge 40 of the cardboard member actually contacts the surface.

From the foregoing description and drawings it should be readily apparent that I have provided a simple yet effective easel structure for supporting picture frames on horizontal surfaces. The structure is capable of withstanding, for substantially indefinite periods of time, forces which would otherwise tend to change the shape of the easel by warping, bending or the like, without necessitating any increase in the size and weight of the easel member. In fact the size and weight of the easel member may be substantially descreased for any given size or weight photograph frame.

It is believed that my invention, its mode of construction and assembly, and many of its advantages should be readily understood from the foregoing without further description, and it should also be manifest that while preferred embodiments of the invention have been shown and described for illustrative purposes, the structural details are nevertheless capable of wide variations within the purview of my invention as defined in the appended claims.

What I claim and desire to secure by Letters Patent of the United States is:

1. In a photograph frame of the character described which includes a backing member; an easel support member hingedly connected to said backing member, said easel support member comprising an elongated strip of a pulp product material, and a pair of channel-shaped members, the marginal side edges of said strip being clamped within said channel-shaped members, said latter-mentioned members being characterized by their ability to maintain their original shape and form throughout the normal life of said photograph frame.

2. The photograph frame of claim 1 in which said easel support member is mounted in an oblique plane and is formed with at least one oblique bottom edge whereby said bottom edge affords a flat supporting surface for said easel when the same is extended to its operational position.

3. The photograph frame of claim 2 in which the bottom edge of at least one of said channel-shaped members is recessed with respect to the bottom edge of said strip.

4. The photograph frame of claim 1 in which said easel support member is formed with an arcuate-shaped bottom edge.

5. In a photograph frame of the character described which includes a backing member; an easel support member hingedly connected to said backing member, said easel support member comprising an elongated strip of relatively thin cardboard and a pair of stiff metal channels, the marginal side edges of said strip embraced in immovable relationship within said channels.

6. In a photograph frame of the character described which includes a backing member; an easel support member hingedly connected to said backing member, said easel support member comprising an elongated strip of relatively thin cardboard, and a pair of stiff reinforcing members affixed one to each of the marginal side edges of said strip, said easel support member being mounted in an oblique plane whereby the photograph frame is supported on a horizontal surface in a plane of more than forty-five degrees with the horizontal surface when said easel support member is extended to operational position with the bottom edge thereof bearing against said horizontal surface.

7. A photograph frame comprising a rectangular channel member, a backing member having the marginal edges thereof positioned in said channel member, an easel strip, and a partial hinge, said partial hinge connecting the top of said easel strip to said backing member, said easel strip comprising an elongated strip of cardboard having straight parallel sides and a pair of metal channels, said metal channels crimped around the marginal edges of the sides of said latter-mentioned strip, said easel strip mounted in an oblique plane, the bottom of said easel strip formed in a substantially V-shape with one leg of said V being longer than the other and said V being coextensive with one corner of said backing member when the easel is folded thereagainst, said legs selectively comprising the supporting surfaces for said easel when the same is extended to operational position.

8. The photograph frame of claim 7 in which the bottom edges of said channels are recessed from the bottom edges of the cardboard portion of the legs of said V.

9. A photograph frame comprising a rectangular channel member, a backing member having the marginal edges thereof positioned in said channel member, an easel strip, and a partial hinge, said partial hinge connecting the top of said easel strip to said backing member, said easel strip comprising an elongated strip of cardboard having straight parallel sides and a pair of metal channels, said metal channels crimped around the marginal edges of the sides of said latter-mentioned strip, said easel strip mounted in an oblique plane, the bottom of said easel strip being convexly arcuate shaped.

No references cited.